United States Patent [19]
Kidd

[11] Patent Number: 5,938,918
[45] Date of Patent: Aug. 17, 1999

[54] DOMESTIC WATER CLARIFIER

[76] Inventor: William J. Kidd, Box 910, Tisdale, Saskatchewan, Canada, S0E 1T0

[21] Appl. No.: 08/907,496

[22] Filed: Aug. 8, 1997

[51] Int. Cl.$^6$ .................................................. C02F 1/52
[52] U.S. Cl. .................. 210/104; 210/105; 210/112; 210/199; 210/202; 210/206; 210/207; 210/257.1; 210/258
[58] Field of Search .............. 210/86, 104, 105, 210/192, 199, 202, 205, 206, 207, 220, 257.1, 258, 738, 112

[56] References Cited

U.S. PATENT DOCUMENTS

| | | | |
|---|---|---|---|
| 2,994,432 | 8/1961 | Schluter | 210/101 |
| 3,404,088 | 10/1968 | Dujardin | 210/44 |
| 3,617,539 | 11/1971 | Grulsch | 210/196 |
| 3,679,053 | 7/1972 | Koulovatos et al. | 210/86 |
| 3,839,199 | 10/1974 | Weiss et al. | 210/20 |
| 3,844,946 | 10/1974 | Farrell | 210/104 |
| 3,920,550 | 11/1975 | Farrell et al. | 210/86 |
| 4,305,826 | 12/1981 | Moses | 210/687 |
| 4,357,242 | 11/1982 | Chandler | 210/712 |
| 4,465,593 | 8/1984 | Wemhoff | 210/96.1 |
| 5,082,560 | 1/1992 | Eli et al. | 210/206 |
| 5,124,049 | 6/1992 | Maness | 210/715 |
| 5,480,559 | 1/1996 | Smisson | 210/727 |
| 5,648,314 | 7/1997 | Lachocki et al. | 210/754 |

FOREIGN PATENT DOCUMENTS

| | | |
|---|---|---|
| 1118123 | 2/1982 | Canada . |
| 2110300 | 5/1992 | Canada . |

*Primary Examiner*—Peter A. Hruskoci
*Attorney, Agent, or Firm*—Adrian D. Battison; Murray E. Thrift

[57] ABSTRACT

A domestic water clarifier comprising a storage tank and a batch tank having an annular inner wall is described. Raw water is pressurized and injected into the batch tank along with a quantity of a flocculent chemical such that the raw water and the flocculent chemical swirl around the inner annular wall of the tank, thereby mixing the raw water and the flocculent chemical. The mixture is then allowed to stand, thereby separating into clarified water and floc. The clarified water is drawn off to the storage tank and stored until needed. The batch tank is then flushed to remove the floc and to prepare the batch tank for the next clarification cycle.

8 Claims, 3 Drawing Sheets

DOMESTIC WATER CLARIFIER

The present invention relates to a water clarifier. More specifically, the present invention relates to a water clarifier for domestic use.

BACKGROUND OF THE INVENTION

Surface water generally contains high levels of dissolved organic carbons which are absorbed into the water while the water runs over fields and forests. In some areas, large water treatment plants are used to remove dissolved organic carbons from the contaminated water. However, these treatment plants cost millions of dollars to build and trained technicians are needed to run the plants. Thus, building treatment plants is clearly impractical for small communities or individual farms which may nonetheless rely on surface water for a large portion of their water supply.

Of the domestic surface water treatment systems available, most use mechanical filters or membranes to remove the dissolved organic carbons. An obvious problem is that a filter or membrane will plug over time and become useless. Some systems attempt to overcome this problem by using raw untreated water to backflush the system, essentially cleaning the filter with raw water. Other systems use high doses of chlorine to oxidize the organic carbons in the water. However, there are considerable health risks involved as chlorination of organic carbons may lead to the formation of trihalimethanes, which are carcinogenic agents. Clearly, a domestic water clarifier is needed that is safe, effective and easy to use.

SUMMARY OF THE INVENTION

According to a first aspect of the invention, there is provided a method of clarifying water from a raw water source, said method comprising:

a) providing a flocculent chemical source;

b) providing a batch tank comprising an annular inner wall;

c) injecting the raw water and the flocculent chemical under pressure into the batch tank;

d) causing the raw water and the flocculent chemical to swirl around the annular inner wall of the batch tank, thereby mixing the raw water and the flocculent chemical;

e) allowing the raw water and flocculent chemical to come to rest, allowing floc to separate from clarified water, thereby producing clarified water and floc;

f) drawing the clarified water out of the batch tank;

g) delivering the clarified water into a holding tank; and h) repeating steps c) to g).

In this manner, the organic carbons are removed from the raw water and the resulting clarified water is stored for later use.

The clarified water may be filtered and/or chlorinated. The filtering removes any residual organic carbons from the clarified water and the chlorination sterilizes the clarified water.

The batch tank may be flushed periodically to remove the floc.

The level of clarified water in the holding tank may be monitored and steps g) and h) are performed in response to the level of clarified water in the holding tank dropping below a given level.

According to a second aspect of the invention, there is provided a system for clarifying water from a raw water source comprising:

a flocculent chemical source;

a batch tank comprising an annular inner wall;

pump means for pressurizing raw water from the raw water source;

injector means for injecting the pressurized raw water from the pump means and flocculent chemical from the flocculent chemical source into the batch tank, said injector means being oriented with respect to the annular inner wall such that the raw water and the flocculent chemical swirl around the annular inner wall of the batch tank, thereby mixing the raw water and the flocculent chemical and producing clarified water and floc;

an outlet for removing the clarified water from the batch tank;

a holding tank connected to the outlet for storing the clarified water; and control means for controlling operation of the pump means, the injector means and the outlet.

The system may include filtering means for receiving the clarified water from the holding tank and filtering the clarified water. The filtering means may comprise a carbon/sand filter.

The system may include chlorinating means for chlorinating the clarified water. The chlorinating means may comprise a chlorine puck within the holding tank or a chlorine pump for receiving the clarified water from the holding tank and chlorinating the water.

The system may include means for flushing the batch tank to remove the floc. Preferably, the batch tank includes a base and the means for flushing the batch tank comprises a pump arranged to draw the floc from the base of the batch tank.

The system may include sensor means for monitoring the level of clarified water in the holding tank.

Preferably, the control means is responsive to the sensor means to a) draw clarified water from the batch tank; and b) repeat the batch process in response the level of the clarified water in the holding tank dropping below a given level.

Thus, the above-described water treatment system is easy to use, compact, affordable and does not require highly trained technical people to operate it.

DETAILED DESCRIPTION

Figure 1:
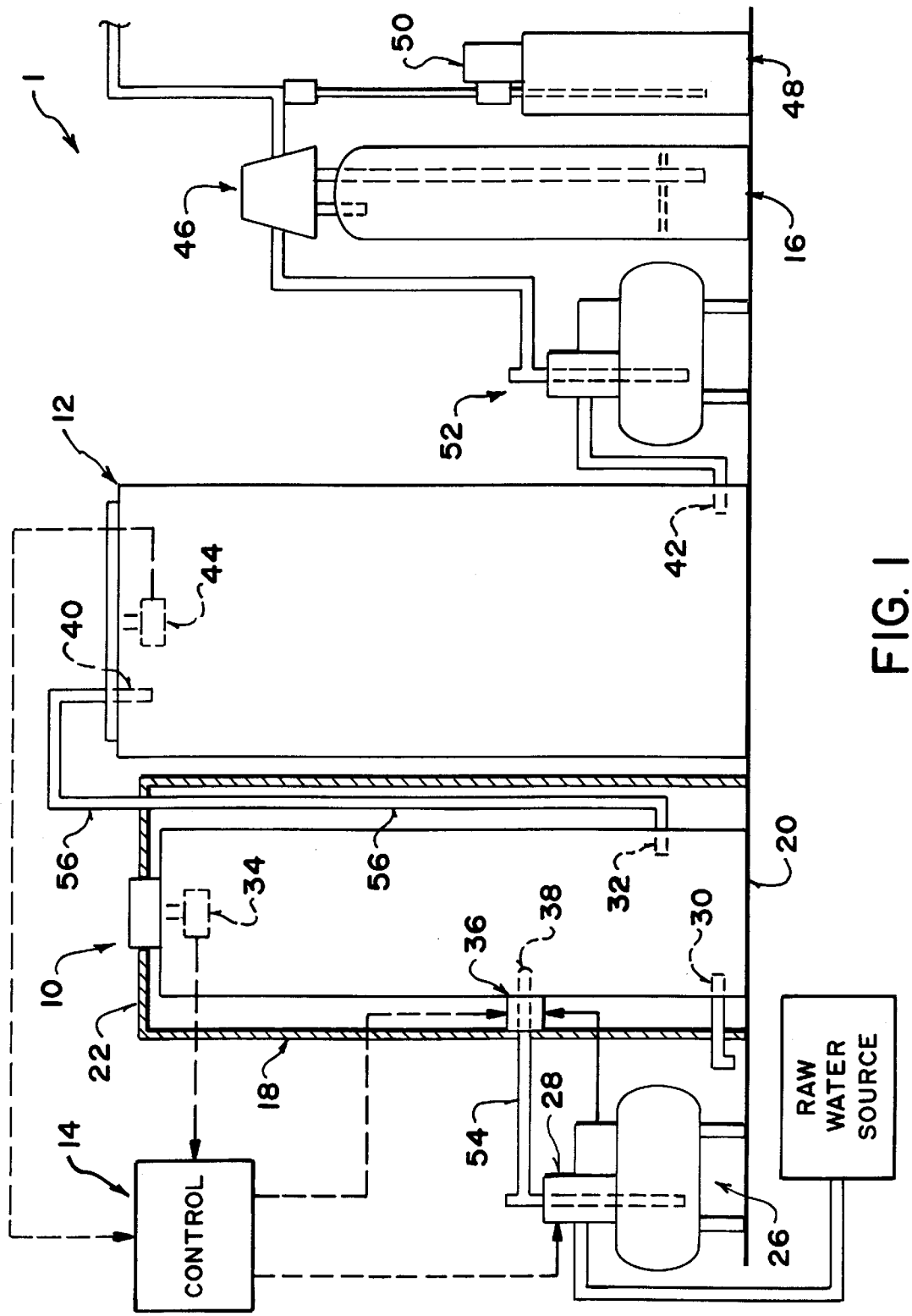
FIG. 1 is a schematic diagram of the water clarifying system.
Figure 2:
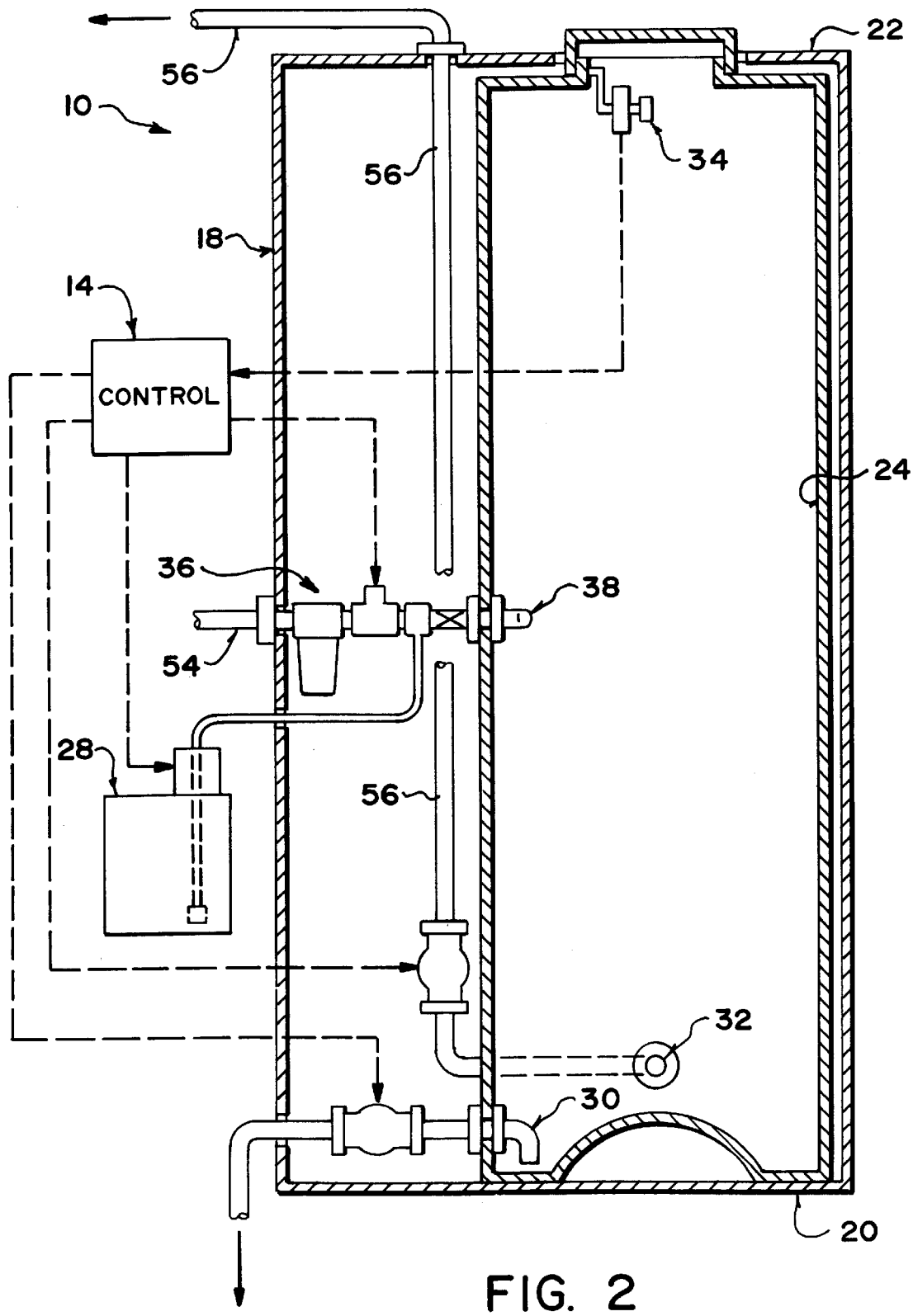
FIG. 2 is a cross-sectional side view of the batch tank.
Figure 3:
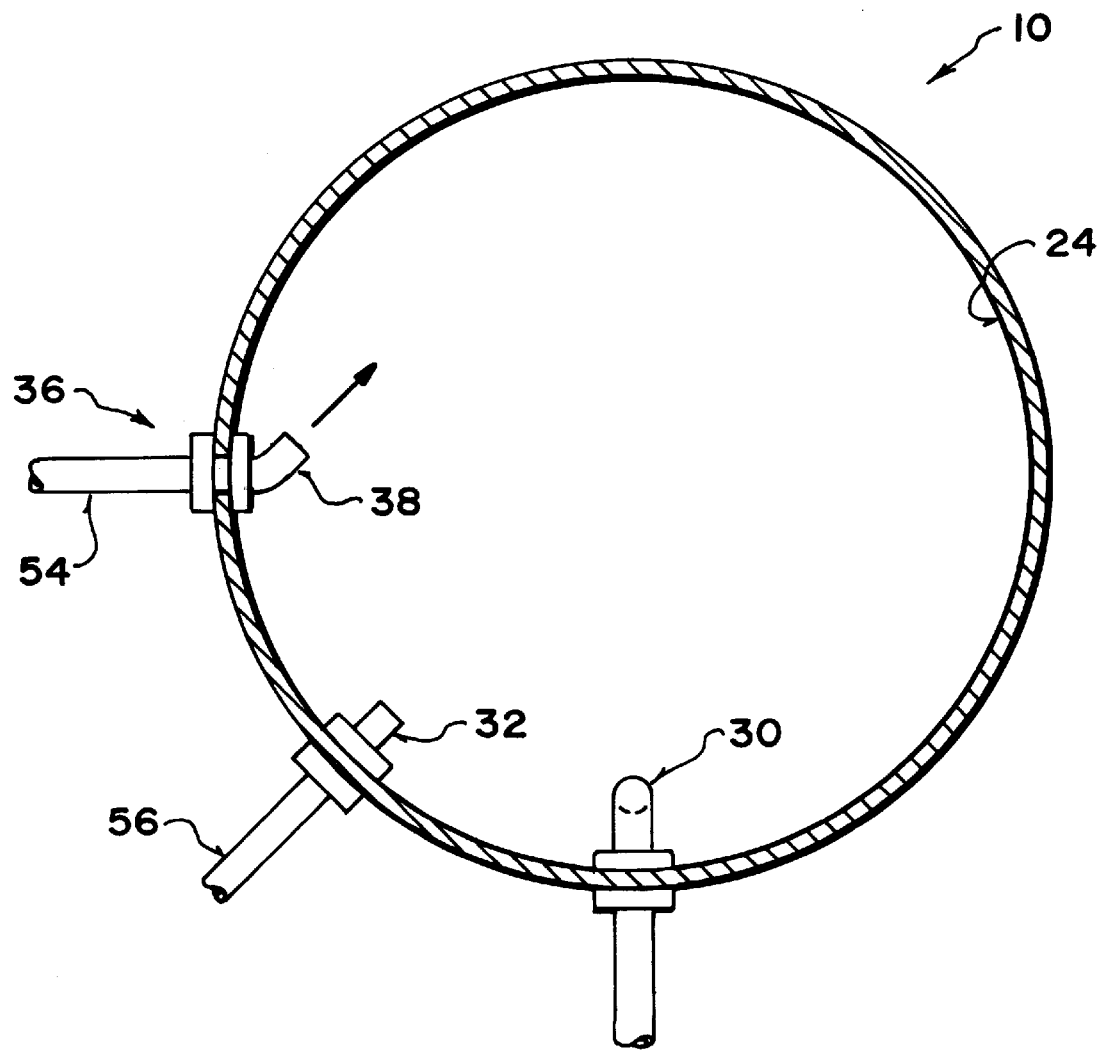
FIG. 3 is a top view of the batch tank.

Referring to the drawings, a water clarifying system 1 for purifying raw water from a raw water source comprises a batch tank 10, a storage tank 12, control means 14 and filters 16.

The batch tank 10 comprises a housing 18 comprising a base 20, a top 22 and an inner annular wall 24. The housing 18 includes a pump 26, a chemical feeder 28, a drain outlet 30, a clarified water outlet 32, a batch sensor 34 and injector means 36. The pump 26 is arranged to be connected to the raw water source for pressurizing the raw water as described below. The chemical feeder 28 provides a predetermined quantity of flocculent chemical to the injector means 36 for injection into the batch tank 10 as described below. In this embodiment, the flocculent chemical is alum, although, alternatively, other flocculent chemicals, such as, for example, ferric chloride, may be used. The drain outlet 30 is situated at the base 20 of the housing 18 for removing sludge and floc from the batch tank 10 as described below. The clarified water outlet 32 is arranged to be above the base 20 of the housing 18 for removing clarified water from the batch tank 10. The batch sensor 34 is arranged to be proximal to the top 22 of the housing 18 for monitoring the water level in the batch tank. Specifically, the batch sensor 34 monitors the water level at a high level wherein the batch tank 10 is full for stopping injection of the raw water and the flocculent chemical and a low level immediately above the clarified water outlet 32 for stopping transfer of the clarified water from the batch tank 10 to the storage tank 12 as described below. The injector means 36 is arranged to inject the pressurized raw water and the flocculent chemical into the batch tank 10 such that the raw water and the flocculent chemical are mixed together as described below. In this embodiment, the injector means 36 comprises an injector 38 arranged relative to the batch tank 10 such that the raw water and the flocculent chemical swirl around the inner annular wall 24 of the batch tank 10, thereby mixing the flocculent chemical and the raw water as described below. Specifically, in this embodiment, the injector 38 is arranged to be at a 45° angle.

The storage tank 12 comprises an inlet 40, an outlet 42 and a storage sensor 44. The inlet 40 is arranged to accept clarified water from the batch tank 10. The outlet 42 is arranged to remove clarified water from the storage tank 12 to the filters 16 as described below. The storage sensor 44 is arranged to measure the clarified water level within the storage tank 12 and is connected to the control means 14. Specifically, the storage sensor 12 is arranged to notify the control means 14 when the level of clarified water in the storage tank 12 is below a given point. In this embodiment, that point is approximately equal to the quantity of clarified water held in the batch tank 10. That is, the storage sensor 44 is arranged to notify the control means 14 when the contents of the batch tank 10 may be emptied into the storage tank 12 as described below.

The control means 14 is linked to the batch sensor 34 and the injector means 36 such that the raw water and the flocculent chemical are injected into the batch tank 10 until the batch tank 10 is full as described below. The control means 14 is linked to the drain outlet 30 for flushing out the batch tank 10, thereby removing floc and sludge left behind after the clarification process from the batch tank 10. The control means 14 is linked to the clarified water outlet 32 and the storage sensor 44 for drawing clarified water from the batch tank 10 to the storage tank 12. The control means 14 is linked to the chemical feeder 28 such that the amount of flocculent chemical injected into the batch tank 10 may be regulated from the control means 14.

The filters 16 comprise a carbon and sand filter 46 and chlorination means 48, the details of which are not shown as these will be well-known. The carbon and sand filter 46 removes residual organic carbons from the clarified water. In alternative arrangements, a membrane filter may be used to remove organic carbons either in place of or in addition to the carbon and sand filter 46. The chlorination means 48 sterilizes the clarified water. In this embodiment, the chlorination means 48 comprises a chlorine injector 50 for adding chlorine to the clarified water as described below. Alternatively, the chlorination means 48 may comprise a chlorine puck in the storage tank for chlorinating the clarified water.

The water clarifying system 1 is assembled as follows. The raw water source is attached to the pump 26 for pressurizing the raw water. The pump 26 is connected to the injector means 36 by pipe means 54 for injecting the pressurized raw water into the batch tank 10 as described below. The drain outlet 30 is connected to a sewer line or the like for disposing of sludge and floc as described below. The clarified water outlet 32 on the batch tank 10 is attached to the inlet 40 on the storage tank 12 by pipe means 56 for removing clarified water from the batch tank 10 to the storage tank 12 for storage therein. The outlet 42 from the storage tank 12 is attached via pump means to the carbon and sand filter 46 for removing residual organic carbons from the clarified water. The carbon and sand filter 46 is connected to the chlorine injector 50 for sterilizing the filtered clarified water. The chlorine injector 50 is connected to the domestic water line to supply clarified water for domestic use. In addition, the water clarifying system 1 may be arranged such that filtered, chlorinated clarified water is used as backwash to clean the carbon and sand filter 46. Thus, the water clarifying system 1 is arranged so that the raw water is clarified in the batch tank 10 and stored in the storage tank 12. As the clarified water is needed, it is drawn from the storage tank 12 and filtered and chlorinated as described below.

In operation, the raw water from the raw water source passes through the pump 26, thereby pressurizing the raw water. The pressurized raw water flows via the injector means 36 into the batch tank 10 while a predetermined quantity of the flocculent chemical from the chemical feeder 28 is injected via the injector means 36. Of note is that the injector means 36 is situated within the housing 18 of the batch tank 10 such that the force of the pressurized raw water entering the batch tank 10 causes the pressurized raw water and the flocculent chemical to swirl around the inner annular wall 24 of the batch tank 10, thereby mixing the pressurized raw water and the flocculent chemical. Specifically, the angle of the injector 38 of the injector means 36 relative to the inner annular wall 24 of the batch tank 10 causes the pressurized raw water and the flocculent chemical to undergo a a rapid clockwise spinning mixing cycle. This spinning mixing cycle is promoted by the shape of the annular inner wall 24. Once the batch sensor 34 signals that the batch tank 10 is full, the control means 14 stops injection of the pressurized raw water by the injector means 36. In the absence of pressurized raw water, the spinning mixing cycle begins to lose velocity, thereby creating ideal coagulating conditions. The flocculent chemical promotes formation of aggregated particles or floc which settle out of solution as the spinning mixing cycle loses velocity. Specifically, the heavy floc sinks to the base 20 of the batch tank 10 while the light floc floats to the top 22 of the batch tank 10. The raw water and the flocculent chemical are allowed to settle for approximately four hours, thereby forming floc and clarified water.

Following the settling period, the pH of the clarified water is measured. It is of note that a pH of 6 or slightly above is recommended and that the pH of the clarified water may be lowered by the addition of more flocculent chemical. If the pH is not in the desired range, the control means 14 is used to open the drain outlet 30 and the injector means 36 so that the batch tank 10 is flushed out. The control means 14 is then used to adjust the chemical feeder 28 so that the amount of flocculent chemical to be added is either increased or decreased as appropriate. The batch tank 10 is then refilled with pressurized raw water and the clarification process is repeated.

Once a batch of the clarified water with a pH in the acceptable range is prepared, the clarified water is transferred from the batch tank 10 to the storage tank 12.

Specifically, the clarified water is drawn from the batch tank 10 out the clarified water outlet 32 and transferred via the inlet 40 to the storage tank 12. It is of note that the clarified water outlet 32 is situated above the base 20 of the batch tank 10 so that the settled floc is not withdrawn from the batch tank 10. Furthermore, the low level of the batch sensor 34 is arranged such that the batch sensor 34 notifies the control means 14 when transfer of the clarified water from the batch tank 10 to the storage tank 12 is complete. Once the clarified water has been transferred, the control means 14 opens the drain outlet 30 and the injector means 36 such that pressurized raw water flushes the batch tank, thereby draining the floc and sediment remaining from the clarification process through the drain outlet 30 and into the sewer line. In this manner, the batch tank is prepared for the next clarification cycle. The clarification process is repeated until both the storage tank 12 and the batch tank 10 are full.

As needed, clarified water is drawn out of the storage tank 12 via the outlet 42 and passed through the carbon and sand filter 46. This filtering step removes any residual organic carbons from the clarified water. Following filtering, the clarified water is chlorinated by the chlorine injector 50 and passed on to the domestic water supply.

It is of note that the storage sensor 44 measures the level of clarified water in the storage tank 12 and sends a signal to the control means 14 to open the clarified water outlet 32 so that clarified water is transferred from the batch tank 10 to the storage tank 12. In this embodiment, the storage sensor 44 is arranged to notify the control means 14 when the level of clarified water in the storage tank 12 is such that the contents of the batch tank 10 may be drained into the storage tank 12.

In this embodiment, the batch tank 10 is arranged to hold 100 gallons and the storage tank 12 is arranged to hold 300 gallons. Thus, 400 gallons of clarified water are available at a given time and additional 100 gallon batches of clarified water may be made every 4 hours. In other embodiments, the sizes of the storage tank 12 and the batch tank 10 may be varied as desired.

In an alternative arrangement, the injector means 36 may comprise one or more injectors arranged tangentally of the inner annular wall 24.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A system for clarifying water from a raw water source for domestic use comprising:

a flocculent chemical source;

a batch tank having a base and an annular inner wall;

pump means for pressurizing raw water from the raw water source;

injector means for injecting the pressurized raw water from the pump means and flocculent chemical from the flocculent chemical source into the batch tank, said injector means being oriented with respect to the annular wall such that the raw water and the flocculent chemical swirl around the inside of the annular inner wall of the batch tank, thereby mixing the raw water and the flocculent chemical and producing clarified water and floc;

an outlet for removing the clarified water from the batch tank arranged below said injector means and above said base;

a holding tank connected to the outlet for storing the clarified water;

a drain outlet at the base of the batch tank for discharging the floc from the batch tank, said drain outlet arranged to be connected directly to a sewer line; and control means for controlling operation of the pump means, the injector means, the clarified water outlet and the drain outlet, wherein said control means is arranged to control said outlet for removing clarified water from said batch tank, and open said drain outlet and said injector means to flush said floc through said drain outlet into said sewer line with said pressurized water.

2. The system according to claim 1 including filtering means for receiving the clarified water from the holding tank and filtering the clarified water.

3. The system according to claim 2 wherein the filtering means comprises a carbon/sand filter.

4. The system according to claim 3 including chlorinating means for chlorinating the clarified water.

5. The system according to claim 3 wherein the chlorinating means comprises a chlorine puck within the holding tank.

6. The system according to claim 3 wherein the chlorinating means comprises a chlorine pump for receiving the clarified water from the holding tank and chlorinating the water.

7. The system according to claim 1 including sensor means for monitoring the level of clarified water in the holding tank.

8. The system according to claim 7 wherein the control means is responsive to the sensor means to a) draw clarified water from the batch tank; and b) repeat the batch process in response the level of the clarified water in the holding tank dropping below a given level.

* * * * *